(12) United States Patent
Zia et al.

(10) Patent No.: US 10,815,874 B2
(45) Date of Patent: Oct. 27, 2020

(54) TURBOCHARGER SYSTEM FOR A ROTARY MACHINE AND METHOD OF ASSEMBLING THE SAME

(71) Applicant: General Electric Company, Schenectady, NY (US)

(72) Inventors: Jalal Hunain Zia, Niskayuna, NY (US); Deoras Prabhudharwadkar, Dubai (AE); Christopher Joseph Homison, Wattsburg, PA (US); Maruthi Manohar Jupudi, Dubai (AE)

(73) Assignee: General Electric Company, Schenectady, NY (US)

( * ) Notice: Subject to any disclaimer, the term of this patent is extended or adjusted under 35 U.S.C. 154(b) by 131 days.

(21) Appl. No.: 16/225,825

(22) Filed: Dec. 19, 2018

(65) Prior Publication Data

US 2019/0195131 A1 Jun. 27, 2019

(30) Foreign Application Priority Data

Dec. 27, 2017 (IN) .............................. 201741046765

(51) Int. Cl.
*F02B 37/10* (2006.01)
*F02B 37/013* (2006.01)
(Continued)

(52) U.S. Cl.
CPC .............. *F02B 37/10* (2013.01); *F01K 23/10* (2013.01); *F02B 37/007* (2013.01); *F02B 37/013* (2013.01); *F02C 6/12* (2013.01); *F02C 6/18* (2013.01); *F02C 7/10* (2013.01); *F02C 7/143* (2013.01); *F02C 9/16* (2013.01); *F02C 9/28* (2013.01); *F05D 2220/40* (2013.01);
(Continued)

(58) Field of Classification Search
CPC ...... F02B 37/10; F02B 37/007; F02B 37/166; F02B 37/013; F02B 37/025; F02C 6/02; F02C 6/12; F01K 23/10
See application file for complete search history.

(56) References Cited

U.S. PATENT DOCUMENTS

| | | |
|---|---|---|
| 3,765,170 A | 10/1973 | Nakamura |
| 5,207,063 A | 5/1993 | Blake |
| 5,809,768 A | 9/1998 | Uematsu et al. |
| 6,324,846 B1 * | 12/2001 | Clarke ...................... F01N 3/32 60/605.2 |
| 6,499,303 B1 | 12/2002 | Polukort et al. |
| 6,557,345 B1 | 5/2003 | Moeckel |
| 6,772,582 B2 | 8/2004 | Reissig |
| 6,860,109 B2 | 3/2005 | Tsuji |

(Continued)

*Primary Examiner* — Todd E Manahan
*Assistant Examiner* — Thuyhang N Nguyen
(74) *Attorney, Agent, or Firm* — James W. Pemrick; Charlotte C. Wilson (57) ABSTRACT

A turbocharger system includes a low pressure turbocharger (LPT) that includes an LPT compressor and an LPT turbine. The turbocharger system is configured to divide ambient air compressed by the LPT compressor into a heat exchanger flow and an HPT compressor inlet flow. The turbocharger system also includes a high pressure turbocharger (HPT) that includes an HPT compressor and an HPT turbine. The HPT compressor is configured to further compress the HPT compressor inlet flow, which is then channeled to a rotary machine as auxiliary compressed air. The turbocharger system further includes a heat exchanger configured to place the heat exchanger flow into thermal communication with exhaust gases associated with the rotary machine. The discharged heat exchanger flow is divided into parallel streams, and the LPT turbine and the HPT turbine are each configured to be driven by a respective one of the parallel streams.

20 Claims, 4 Drawing Sheets

(51) Int. Cl.
  *F01K 23/10* (2006.01)
  *F02C 6/18* (2006.01)
  *F02B 37/007* (2006.01)
  *F02C 6/12* (2006.01)
  *F02C 7/10* (2006.01)
  *F02C 7/143* (2006.01)
  *F02C 9/16* (2006.01)
  *F02C 9/28* (2006.01)

(52) U.S. Cl.
  CPC ...... *F05D 2220/62* (2013.01); *F05D 2260/20* (2013.01); *F05D 2260/42* (2013.01)

(56) References Cited

U.S. PATENT DOCUMENTS

| | | |
|---|---|---|
| 6,901,759 B2 | 6/2005 | Frutschi |
| 8,938,962 B2 * | 1/2015 | Pierpont .............. F02B 37/001 60/605.2 |
| 8,973,373 B2 | 3/2015 | Arar |
| 9,388,737 B2 | 7/2016 | Kraft |
| 9,695,749 B2 | 7/2017 | Kraft |
| 2007/0193270 A1 * | 8/2007 | Roozenboom ........ F02B 37/001 60/612 |
| 2010/0000219 A1 | 1/2010 | Snook et al. |
| 2013/0067933 A1 | 3/2013 | Veith et al. |
| 2014/0208730 A1 | 7/2014 | Kraft |
| 2014/0250902 A1 * | 9/2014 | Kraft ....................... F02C 7/10 60/773 |

* cited by examiner

TURBOCHARGER SYSTEM FOR A ROTARY MACHINE AND METHOD OF ASSEMBLING THE SAME

TECHNICAL FIELD

The field of the disclosure relates generally to rotary machines, and more particularly to a turbocharger system for use with a rotary machine.

BACKGROUND

At least some known rotary machines include a compressor, a combustor, and a turbine coupled together in a serial flow relationship. More specifically, ambient air is channeled to the compressor. Compressed air is discharged from the compressor, mixed with fuel, and ignited in the combustor to form a high energy gas stream. The high energy gas stream flows through the turbine to rotatably drive the turbine. The compressor and turbine are coupled through a shaft to form a rotor assembly, such that rotation of the turbine drives the compressor and a load coupled to the shaft.

A power output of known rotary machines is limited by a mass flow rate of working fluid through the rotary machine. For example, a compressor intake mass flow of the rotary machine is decreased during high temperature ambient conditions due to the decrease in ambient air density, limiting a power output of the rotary machine in such ambient conditions.

In addition, in at least some known rotary machines, air is extracted from the compressor and used for purposes other than combustion. The extracted air is used, for example, to cool components of the turbine exposed to the hot high energy gas stream. However, as a quantity of air extracted from the compressor for cooling or other purposes increases, an efficiency of the rotary machine decreases.

BRIEF DESCRIPTION

In one aspect, a turbocharger system is provided. The turbocharger system includes a low pressure turbocharger (LPT) that includes an LPT compressor and an LPT turbine coupled together via an LPT rotor. The LPT compressor is configured to receive and compress ambient air, and the turbocharger system is configured to divide the compressed ambient air into a heat exchanger flow and an HPT compressor inlet flow. The turbocharger system also includes a high pressure turbocharger (HPT) that includes an HPT compressor and an HPT turbine coupled together via an HPT rotor. The HPT compressor is configured to receive and further compress the HPT compressor inlet flow, and the turbocharger system is configured to channel the compressed HPT compressor inlet flow to a rotary machine as auxiliary compressed air. The turbocharger system further includes a heat exchanger configured to place the heat exchanger flow into thermal communication with exhaust gases associated with the rotary machine. The turbocharger system is configured to divide the heat exchanger flow discharged from the heat exchanger into parallel streams, and the LPT turbine and the HPT turbine are each configured to be driven by a respective one of the parallel streams.

In another aspect, a rotary machine is provided. The rotary machine includes a compressor section configured to receive and compress intake air, a turbine section coupled to the compressor section via a rotor, and a combustor section. The combustor section includes at least one combustor configured to receive the compressed intake air from the compressor section, generate combustion gases, and channel the combustion gases into the turbine section such that a rotational force is imparted on the rotor. The combustion gases are exhausted from the turbine section as exhaust gases. The rotary machine also includes a turbocharger system. The turbocharger system includes a low pressure turbocharger (LPT) that includes an LPT compressor and an LPT turbine coupled together via an LPT rotor. The LPT compressor is configured to receive and compress ambient air, and the turbocharger system is configured to divide the compressed ambient air into a heat exchanger flow and an HPT compressor inlet flow. The turbocharger system also includes a high pressure turbocharger (HPT) that includes an HPT compressor and an HPT turbine coupled together via an HPT rotor. The HPT compressor is configured to receive and further compress the HPT compressor inlet flow, and the turbocharger system is configured to channel the compressed HPT compressor inlet flow to at least one of the combustor section and the turbine section as auxiliary compressed air. The turbocharger system further includes a heat exchanger configured to place the heat exchanger flow into thermal communication with the exhaust gases. The turbocharger system is configured to divide the heat exchanger flow discharged from the heat exchanger into parallel streams, and the LPT turbine the HPT turbine are each configured to be driven by a respective one of the parallel streams.

In another aspect, a method of assembling a turbocharger system for a rotary machine is provided. The method includes coupling an outlet of an LPT compressor of a low pressure turbocharger (LPT) in flow communication with, in parallel, an inlet of a heat exchanger and an inlet of an HPT compressor of a high pressure turbocharger (HPT). The LPT includes an LPT turbine coupled to the LPT compressor via an LPT rotor, the HPT includes an HPT turbine coupled to the HPT compressor via an HPT rotor, and the LPT compressor is configured to receive ambient air and supply LPT compressed air via the outlet of the LPT compressor. The method also includes configuring the heat exchanger to place the LPT compressed air received from the outlet of the LPT compressor into thermal communication with exhaust gases associated with the rotary machine. The method further includes coupling an outlet of the heat exchanger in flow communication with, in parallel, an inlet of the LPT turbine and an inlet of the HPT turbine. Additionally, the method includes coupling an outlet of the HPT compressor in flow communication with the rotary machine. The HPT compressor is configured to supply auxiliary compressed air via the outlet of the HPT compressor.

DETAILED DESCRIPTION

The embodiments described herein overcome at least some of the disadvantages of known rotary machines. The embodiments include a turbocharger system that includes a low pressure turbocharger (LPT) and a high pressure turbocharger (HPT). The turbocharger system divides ambient air compressed by the LPT compressor into a heat exchanger flow and an HPT compressor inlet flow. The HPT compressor further compress the HPT compressor inlet flow, which is then channeled to the rotary machine as auxiliary compressed air. The heat exchanger places the heat exchanger flow into thermal communication with exhaust gases associated with the rotary machine. The discharged heat exchanger flow is divided into parallel streams, and the LPT turbine and the HPT turbine are each driven by a respective one of the parallel streams.

For example, the auxiliary compressed air is channeled to at least one of a combustor section and a turbine section of the rotary machine for cooling purposes. For another example, the auxiliary compressed air is added to the mass flow of combustion gases through the rotary machine. In some embodiments, the LPT turbine and the HPT turbine are each driven solely by the respective one of the parallel streams after start-up of the turbocharger system, such that no energy is tapped from the rotary machine upstream in the working fluid path, or from external sources, to drive the turbocharger system after start-up. In certain embodiments, the turbocharger system includes a controller and at least one actuator configured to regulate a work load balance, or distribution, between the LPT and HPT across varying ambient conditions and/or operating points of the rotary machine. In some embodiments, the turbocharger system is additionally operable in a second, waste-heat-to-power-storage mode and a third, stored-power-to-rotary-machine-augmentation mode, which further facilitates efficient operation of the rotary machine across varying ambient and load conditions.

Unless otherwise indicated, approximating language, such as "generally," "substantially," and "about," as used herein indicates that the term so modified may apply to only an approximate degree, as would be recognized by one of ordinary skill in the art, rather than to an absolute or perfect degree. Accordingly, a value modified by a term or terms such as "about," "approximately," and "substantially" is not to be limited to the precise value specified. In at least some instances, the approximating language may correspond to the precision of an instrument for measuring the value. Additionally, unless otherwise indicated, the terms "first," "second," etc. are used herein merely as labels, and are not intended to impose ordinal, positional, or hierarchical requirements on the items to which these terms refer. Moreover, reference to, for example, a "second" item does not require or preclude the existence of, for example, a "first" or lower-numbered item or a "third" or higher-numbered item.

Figure 1:
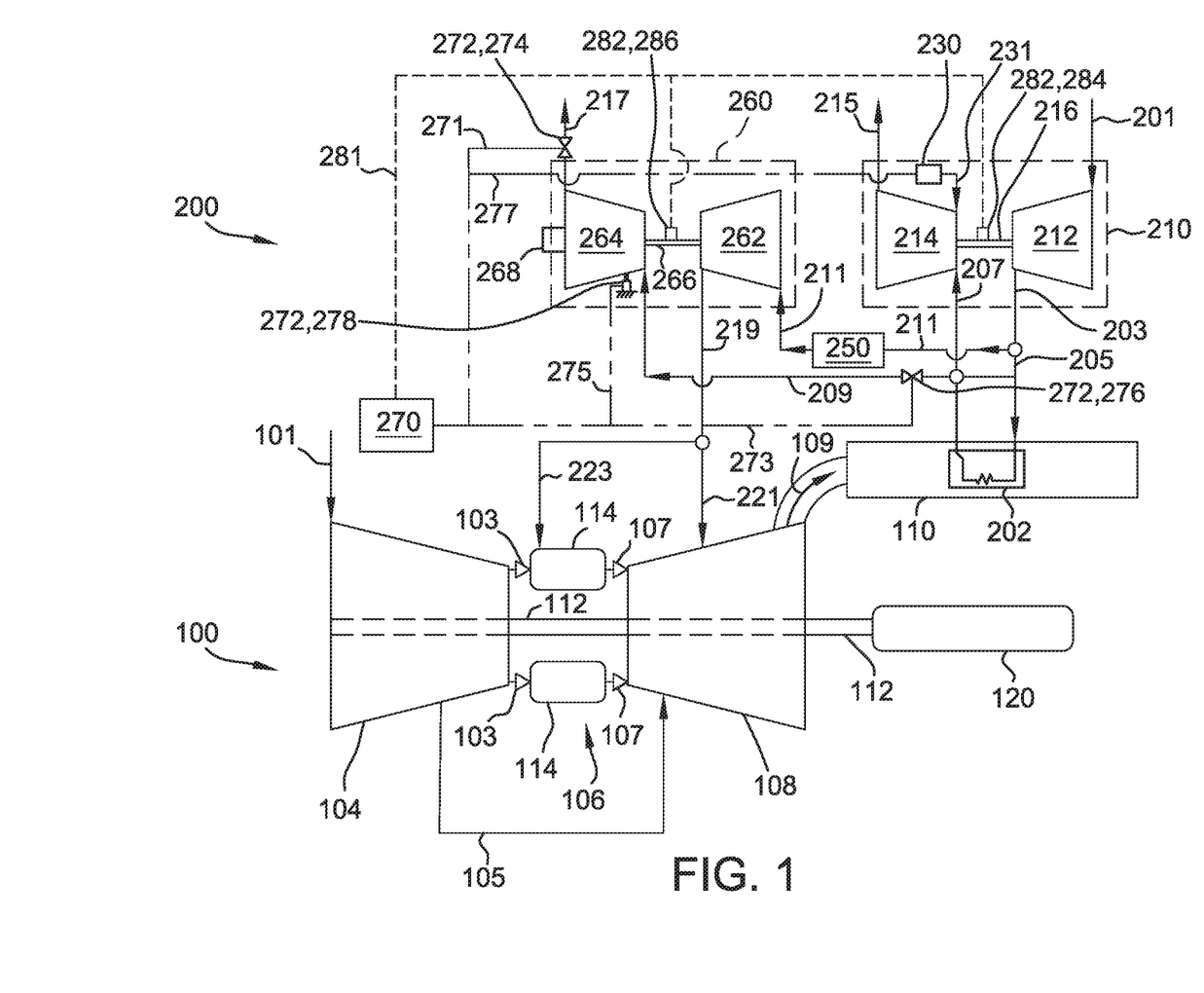
FIG. 1 is a schematic view of an exemplary rotary machine coupled to an exemplary turbocharger system.

FIG. 1 is a schematic view of an exemplary rotary machine 100 coupled to an exemplary turbocharger system, designated turbocharger system 200. In the exemplary embodiment, rotary machine 100 is a gas turbine engine. Alternatively, rotary machine 100 may be any other turbine engine and/or rotary machine, including, without limitation, a gas turbofan aircraft engine or other aircraft engine. In the exemplary embodiment, rotary machine 100 includes a compressor section 104, a combustor section 106 coupled downstream from compressor section 104, a turbine section 108 coupled downstream from combustor section 106, and an exhaust section 110 coupled downstream from turbine section 108. Turbine section 108 is coupled to compressor section 104 via a rotor 112. It should be noted that, as used herein, the term "couple" is not limited to a direct mechanical, electrical, and/or communication connection between components, but may also include an indirect mechanical, electrical, and/or communication connection between multiple components. Rotor 112 is further coupled to a load 120 such as, but not limited to, an electrical generator and/or a mechanical drive application.

During operation, intake air 101 is channeled towards compressor section 104. Compressor section 104 compresses the received intake air 101 and discharges compressed air 103, also referred to as compressor discharge casing (CDC) air 103. CDC air 103 is channeled into combustor section 106. In the exemplary embodiment, combustor section 106 includes a plurality of combustors 114, and combustor section 106 is coupled to compressor section 104 such that each of combustors 114 receives CDC air 103 from compressor section 104. In combustors 114, CDC air 103 is mixed with fuel and ignited to generate high temperature combustion gases 107. Combustion gases 107 are channeled into turbine section 108 and impart a rotational force on rotor 112, which drives compressor section 104 and load 120. Combustion gases 107 are exhausted from turbine section 108 as exhaust gases 109, which are channeled into exhaust section 110. Exhaust gases 109 retain residual heat, such that exhaust gases 109 are at an exhaust temperature above a temperature of ambient air 201.

Also during operation, in some embodiments, a compressor extraction flow 105 is extracted from compressor section 104 and channeled for uses other than in combustor section 106. For example, in the exemplary embodiment, compressor extraction flow 105 is channeled directly (that is, not through combustors 114) to turbine section 108 and used to cool components of turbine section 108 exposed to hot combustion gases 107. In alternative embodiments, compressor extraction flow 105 is channeled to any other suitable use or combination of uses apart from combustion in combustors 114. However, removal of compressor extraction flow 105 from the working fluid path through rotary machine 100 reduces an efficiency of rotary machine 100. More specifically, as a quantity of compressor extraction flow 105 increases relative to CDC air 103, an efficiency of rotary machine 100 correspondingly decreases.

Turbocharger system 200 is configured to provide auxiliary compressed air 219 to rotary machine 100 without reducing the efficiency of rotary machine 100. More specifically, turbocharger system 200 includes a heat exchanger 202 that places ambient air 201 in thermal communication with exhaust gases 109. In operation, after a start-up phase is completed, turbocharger system 200 relies solely on the residual heat in exhaust gases 109, rather than tapping energy from rotary machine 100 upstream in the working fluid path or from an external power source, to compress ambient air 201 to produce auxiliary compressed air 219. For example, turbocharger system 200 is configured to channel auxiliary compressed air 219 to at least one of combustor section 106 and turbine section 108, such as for cooling purposes. In some embodiments, auxiliary compressed air 219 supplied by turbocharger system 200 is used as an alternative to increasing the amount of compressor extraction flow 105 relative to CDC air 103.

In the exemplary embodiment, turbocharger system 200 includes a low pressure turbocharger (LPT) 210 and a high pressure turbocharger (HPT) 260 coupled downstream from LPT 210. In alternative embodiments, turbocharger system 200 includes any suitable number of turbochargers. In the exemplary embodiment, LPT 210 includes an LPT compressor 212 and an LPT turbine 214 coupled together via an LPT rotor 216, and HPT 260 similarly includes an HPT compressor 262 and an HPT turbine 264 coupled together via an HPT rotor 266.

In the exemplary embodiment, each of LPT rotor 216 and HPT rotor 266 is not coupled to rotor 112 of rotary machine 100. Thus, each of LPT 210 and HPT 260 is operable at a speed independent of a speed of rotor 112. In some such embodiments, LPT 210 and HPT 260 are operated at relatively high speeds compared to rotor 112, such that a size of LPT 210 and HPT 260 needed to produce a selected amount of compression of ambient air 201 is correspondingly reduced. Moreover, in the exemplary embodiment, LPT rotor 216 and HPT rotor 266 are not coupled to each other, such that LPT 210 and HPT 260 are operable at speeds independent of each other. In some such embodiments, LPT 210 and HPT 260 operable at independent speeds facilitates maintaining a selected work load distribution between LPT 210 and HPT 260, for example to meet a required pressure and a selected flow rate for injection of auxiliary compressed air 219 into rotary machine 100 across varying ambient conditions and/or operating points of rotary machine 100.

During operation, LPT compressor 212 receives ambient air 201, compresses ambient air 201, and discharges the compressed ambient air 201 as LPT compressed air 203. LPT compressed air 203 is then divided by turbocharger system 200 into a heat exchanger flow 205 and an HPT compressor inlet flow 211. Heat exchanger 202 receives heat exchanger flow 205 and places heat exchanger flow 205 into thermal communication with exhaust gases 109, such that at least a portion of the residual heat of exhaust gases 109 is transferred to heat exchanger flow 205.

In the exemplary embodiment, heat exchanger 202 is positioned within exhaust section 110 of rotary machine 100. In some embodiments, rotary machine 100 is part of a simple cycle gas turbine power plant, in which exhaust section 110 is coupled to an exhaust stack (not shown), and heat exchanger 202 is coupled upstream from the exhaust stack. In other embodiments, rotary machine 100 is part of a combined cycle gas turbine power plant, in which exhaust section 110 is coupled to a heat recovery steam generator (HRSG) configured to supply steam to at least one steam turbine (not shown). For example, the combined cycle power plant is configured to selectively channel exhaust gases 109 to either the HRSG or a bypass stack (not shown) depending upon operating conditions, and heat exchanger 202 is coupled upstream from the bypass stack, such that turbocharger system 200 is activatable when the combined cycle gas turbine power plant is operated in a simple cycle mode using the bypass stack. In alternative embodiments, rotary machine 100 is used in any suitable application, and/or heat exchanger 202 is positioned at any suitable location, that enables turbocharger system 200 to function as described herein.

The heat exchanger flow 205 heated and discharged from heat exchanger 202 is divided by turbocharger system 200 into parallel streams 207 and 209, and LPT turbine 214 and HPT turbine 264 are each configured to be driven by a respective one of the parallel streams 207, 209. More specifically, heat exchanger flow 205 is divided into an LPT turbine inlet flow 207 and an HPT turbine inlet flow 209. LPT turbine 214 receives LPT turbine inlet flow 207, and LPT turbine inlet flow 207 imparts a rotational force on LPT rotor 216, which drives LPT compressor 212. Thus, after start-up of turbocharger system 200 is completed, that is, after sufficient LPT turbine inlet flow 207 is received from heat exchanger 202 to establish self-sustaining operation of turbocharger system 200 using solely the residual heat in exhaust gases 109, no energy is tapped from rotary machine 100 upstream in the working fluid path, or from external sources, to power LPT 210. In other words, LPT turbine 214 is configured to be driven solely by LPT turbine inlet flow 207 during post-start-up operation of turbocharger system 200. LPT turbine 214 exhausts LPT turbine inlet flow 207 to ambient as LPT exhaust 215.

In the exemplary embodiment, HPT compressor inlet flow 211 is first channeled through an intercooler 250 positioned in flow communication between an outlet of LPT compressor 212 and an inlet of HPT compressor 262. Intercooler 250 is suitably configured to decrease a temperature of the received HPT compressor inlet flow 211. For example, but not by way of limitation, intercooler 250 places HPT compressor inlet flow 211 into thermal communication with a suitable flow of fluid (not shown) that is at a lower temperature than HPT compressor inlet flow 211 received by intercooler 250, as is known in the art. In the exemplary embodiment, intercooler 250 facilitates removing a portion of the heat imparted to HPT compressor inlet flow 211 by LPT compressor 212, thereby increasing a density of HPT compressor inlet flow 211 discharged from intercooler 250 and received by HPT compressor 262. In alternative embodiments, turbocharger system 200 does not include intercooler 250.

HPT compressor 262 receives HPT compressor inlet flow 211, further compresses HPT compressor inlet flow 211, and discharges the compressed HPT compressor inlet flow 211 as auxiliary compressed air 219.

HPT turbine 264 receives HPT turbine inlet flow 209, and HPT turbine inlet flow 209 imparts a rotational force on HPT rotor 266, which drives HPT compressor 262. Thus, after completion of start-up of turbocharger system 200, no energy is tapped from rotary machine 100 upstream in the working fluid path, or from external sources, to power HPT 260. In other words, HPT turbine 264 is configured to be driven solely by HPT turbine inlet flow 209 during post-start-up operation of turbocharger system 200. HPT turbine 264 exhausts HPT turbine inlet flow 209 to ambient as HPT exhaust 217.

In the exemplary embodiment, turbocharger system 200 includes a controller 270 and at least one actuator 272 configured to regulate a work load distribution between LPT 210 and HPT 260, thereby facilitating regulation of a compression ratio of turbocharger system 200, defined as a ratio of a pressure of auxiliary compressed air 219 to a pressure of ambient air 201. More specifically, the work load distribution between LPT 210 and HPT 260 is dependent upon current ambient conditions and/or a current operating point of rotary machine 100, both of which affect a mass flow rate and/or a temperature of, and thus an amount of residual heat available to heat exchanger 202 from, exhaust gases 109. Controller 270 is operatively coupled to the at least one actuator 272, and is programmed to regulate the at least one actuator 272 to regulate the work load distribution between LPT 210 and HPT 260 and, correspondingly, the compression ratio produced by turbocharger system 200, across varying ambient conditions and/or operating points of rotary machine 100. Additionally or alternatively, controller 270 is programmed to regulate the at least one actuator 272 to regulate the work load distribution between LPT 210 and HPT 260 to meet a required pressure and a selected flow rate for injection of auxiliary compressed air 219 into rotary machine 100 across varying ambient conditions and/or operating points of rotary machine 100.

For example, in some embodiments, the at least one actuator 272 is a valve 274 coupled downstream from an outlet of HPT turbine 264 and operable to regulate a flow rate of HPT exhaust 217. Regulation of valve 274 in turn affects the upstream division of heated heat exchanger flow 205 into LPT turbine inlet flow 207 and HPT turbine inlet flow 209. Controller 270 is programmed to regulate valve 274 via a control signal 271 to regulate the work load distribution between LPT 210 and HPT 260.

For another example, in certain embodiments, the at least one actuator 272 is a valve 276 coupled upstream from an inlet of HPT turbine 264 and operable to regulate a flow rate of HPT turbine inlet flow 209. Regulation of valve 276 in turn affects the upstream division of heated heat exchanger flow 205 into LPT turbine inlet flow 207 and HPT turbine inlet flow 209. Controller 270 is programmed to regulate valve 276 via a control signal 273 to regulate the work load distribution between LPT 210 and HPT 260.

For another example, in certain embodiments, the at least one actuator 272 is a geometry adjustment actuator 278 coupled to HPT turbine 264 and operable to regulate a geometry of HPT turbine 264 (i.e., HPT turbine 264 is implemented as a suitable variable geometry turbine). Regulation of geometry adjustment actuator 278 to vary the geometry of HPT turbine 264 in turn affects the upstream division of heated heat exchanger flow 205 into LPT turbine inlet flow 207 and HPT turbine inlet flow 209. Controller 270 is programmed to regulate geometry adjustment actuator 278 via a control signal 275 to regulate the work load distribution between LPT 210 and HPT 260.

Although valves 274 and 276 and geometry adjustment actuator 278 are all illustrated in FIG. 1, it should be understood that in some embodiments, turbocharger system 200 includes and/or regulates only one of valve 274, valve 276, and geometry adjustment actuator 278 to regulate the work load distribution between LPT 210 and HPT 260. Alternatively, turbocharger system 200 includes and/or uses two or more of valve 274, valve 276, and geometry adjustment actuator 278 to regulate the work load distribution between LPT 210 and HPT 260.

In alternative embodiments, the at least one actuator 272 includes any suitable number and type of actuating devices each coupled to any suitable location of turbocharger system 200 that enables controller 270 to regulate the work load distribution between LPT 210 and HPT 260 and, correspondingly, the compression ratio of turbocharger system 200 and/or the injection pressure and flow rate of auxiliary compressed air 219 into rotary machine 100, across varying ambient conditions and/or operating points of rotary machine 100 as described herein. For example, but not by way of limitation, the at least one actuator 272 includes an auxiliary load (not shown) coupleable to at least one of LPT rotor 216 and HPT rotor 266, and controller 270 is programmed to selectively couple the auxiliary load to one of LPT rotor 216 and HPT rotor 266 to regulate the work load distribution between LPT 210 and HPT 260 by selective power extraction using the auxiliary load.

In some embodiments, turbocharger system 200 further includes at least one sensor 282, and controller 270 is further programmed to regulate the work load distribution between LPT 210 and HPT 260 based on feedback received from the at least one sensor 282. More specifically, controller 270 is operatively coupled to the at least one sensor 282 and programmed to receive a corresponding at least one feedback signal 281 from the at least one sensor 282. For example, in the exemplary embodiment, the at least one sensor 282 includes an LPT speed sensor 284 configured to sense a speed of LPT rotor 216, and an HPT speed sensor 286 configured to sense a speed of HPT rotor 266. Additionally or alternatively, the at least one sensor 282 includes any suitable sensor that enables controller 270 to function as described herein.

As described above, after start-up, turbocharger system 200 relies solely on the residual heat in exhaust gases 109, rather than tapping energy from rotary machine 100 upstream in the working fluid path or from an external power source, to compress ambient air 201 to produce auxiliary compressed air 219. In other words, as described above, LPT turbine 214 and HPT turbine 264 are each configured to be driven solely by the respective one of the parallel streams 207, 209 discharged from heat exchanger 202 during post-start-up operation of turbocharger system 200. However, in the exemplary embodiment, turbocharger system 200 includes a start-up power source 230 coupled to LPT 210. At start-up of turbocharger system 200, before LPT rotor 216 is in operation to cause LPT compressor 212 to channel ambient air 201 therethrough to heat exchanger 202, start-up power source 230 is operable to activate LPT compressor 212. For example, controller 270 is operatively coupled to start-up power source 230 and programmed to selectively activate start-up power source 230 at start-up of turbocharger system 200, and to selectively deactivate start-up power source 230 after start-up is completed, that is, after sufficient LPT turbine inlet flow 207 is received from heat exchanger 202 to establish self-sustaining operation of turbocharger system 200 using solely the residual heat in exhaust gases 109.

For example, in the exemplary embodiment, start-up power source 230 is an external source of compressed air 231 coupled to LPT turbine 214. Moreover, controller 270 is operatively coupled to start-up power source 230 and programmed to selectively activate start-up power source 230 at start-up via a control signal 277. The externally supplied compressed air 231 imparts a rotational force on LPT rotor 216, which drives LPT compressor 212 at start-up of turbocharger system 200. In alternative embodiments, controller 270 is programmed to selectively route a portion (not shown) of compressor extraction flow 105 to be used as external source of compressed air 231 during start-up of turbocharger system 200, such that compressor section 104 of rotary machine 100 is used as start-up power source 230. In other alternative embodiments, start-up power source 230 includes a motor operable to drive LPT rotor 216, and controller 270 is operatively coupled to the motor and programmed to selectively activate the motor at start-up, and to selectively deactivate the motor after start-up is completed. In still other alternative embodiments, start-up power source 230 is any suitable power source that enables turbocharger system 200 to function as described herein.

In some embodiments, turbocharger system 200 provides a compression ratio between auxiliary compressed air 219 and ambient air 201 of at least 10. Moreover, in some such embodiments, turbocharger system 200 provides a compression ratio between auxiliary compressed air 219 and ambient air 201 of at least 12. Also, in some such embodiments, the relatively high compression ratio provided by turbocharger system 200 is associated with a correspondingly high thrust load on HPT rotor 266, as compared to a thrust load on HPT rotors of at least some known high pressure turbochargers. In some such embodiments, HPT 260 includes an enhanced thrust bearing 268 configured to support the relatively increased thrust load on HPT rotor 266. More specifically, enhanced thrust bearing 268 has increased bearing capability as compared to thrust bearings for known turbochargers associated with, for example, reciprocating engines. For example, enhanced thrust bearing 268 is larger in size, strength, and/or mass than thrust bearings associated with rotors of at least some known high pressure turbochargers of similar size, such as those used with reciprocating engines. For another example, enhanced thrust bearing 268 is implemented via pressure buffering of backdisks of a turbine wheel (not shown) of HPT compressor 262 and/or HPT turbine 264. In certain embodiments, HPT 260 is formed in part from a commercial off-the-shelf (COTS) high pressure turbocharger, and the original HPT turbine component is modified to include enhanced thrust bearing 268 that is, for example, larger in size, strength, and/or mass than the thrust bearing provided with the initial COTS item, and/or adds pressure buffering of the backdisks to the initial COTS item. In alternative embodiments, HPT 260 does not include enhanced thrust bearing 268. For example, HPT 260 includes a standard thrust bearing 268 provided with a COTS high pressure turbocharger.

In the exemplary embodiment, at least a portion 221 of auxiliary compressed air 219 is channeled to turbine section 108 of rotary machine 100. More specifically, turbine section 108 is configured to use the received portion 221 of auxiliary compressed air 219 to cool components of turbine section 108 exposed to high temperature combustion gases 107, such as rotor blades or a turbine nozzle. Thus, auxiliary compressed air 219 provided by turbocharger system 200 facilitates reducing or eliminating a quantity of compressor extraction flow 105 used to cool turbine section 108, such that an efficiency of rotary machine 100 correspondingly increases. In alternative embodiments, portion 221 of auxiliary compressed air 219 is channeled to a mixing system of combustor section 106 for use in heating received CDC air 103 and/or a fuel channeled into at least one combustor 114, for example.

Additionally or alternatively, in some embodiments, at least a portion 223 of auxiliary compressed air 219 is channeled to an inlet of at least one combustor 114. More specifically, the at least one combustor 114 is configured to channel portion 223 of auxiliary compressed air 219 into a flow path of combustion gases 107 such that a mass flow rate and/or temperature of combustion gases 107 through rotary machine 100 is increased. Thus, auxiliary compressed air 219 provided by turbocharger system 200 facilitates an increased power output of rotary machine 100 for a given set of ambient conditions. For example, but not by way of limitation, during high temperature ambient conditions, a mass flow of intake air 101 into compressor section 104 of rotary machine 100 is relatively decreased due to the decrease in ambient air density, which correspondingly reduces the mass flow of combustion gases 107 and thereby limits a power output of rotary machine 100. However, the high temperature ambient conditions also result in a relatively larger amount of residual heat in exhaust gases 109 that may not be capable of efficient use in, for example, a heat recovery steam generator (not shown). Portion 223 of auxiliary compressed air 219, provided by turbocharger system 200 from the residual heat in exhaust gases 109, and/or a corresponding increase in combustor fuel flow rate enabled by the addition of portion 223 of auxiliary compressed air 219, facilitates increasing the power output of rotary machine 100. For another example, but not by way of limitation, during operation of rotary machine 100 at output demands that are lower than a baseload of rotary machine 100, a flow rate of intake air 101 is selectively reduced, such as by closing inlet guide vanes (not shown) of rotary machine 100, and portion 223 of auxiliary compressed air 219 is added to the flow path of combustion gases 107, resulting in decreased fuel flow requirements in combustor section 106 and, thus, a more efficient operation of rotary machine 100.

In the exemplary embodiment, turbocharger system 200 further includes a suitable isolation device (not shown) in the flow path of portion 221 and/or portion 223 of auxiliary compressed air 219, such that back flow from rotary machine 100 into turbocharger system 200 is inhibited, for example in a scenario in which a pressure of turbocharger system 200 decreases below a pressure of rotary machine 100 at the point of injection of auxiliary compressed air 219.

Although LPT compressed air 203 in the exemplary embodiment is divided by turbocharger system 200 into heat exchanger flow 205 and HPT compressor inlet flow 211, it should be understood that in some embodiments, an additional portion of LPT compressed air 203 is channeled directly to rotary machine 100 for suitable use. For example, in some embodiments, a temperature of LPT compressed air 203 is suitable for cooling a casing of turbine section 108 of rotary machine 100, and a portion (not shown) of LPT compressed air 203 is channeled to the casing of turbine section 108 for cooling purposes, for example to facilitate maintaining a selected clearance gap between the casing and a plurality of blades of turbine section 108.

Figure 2:
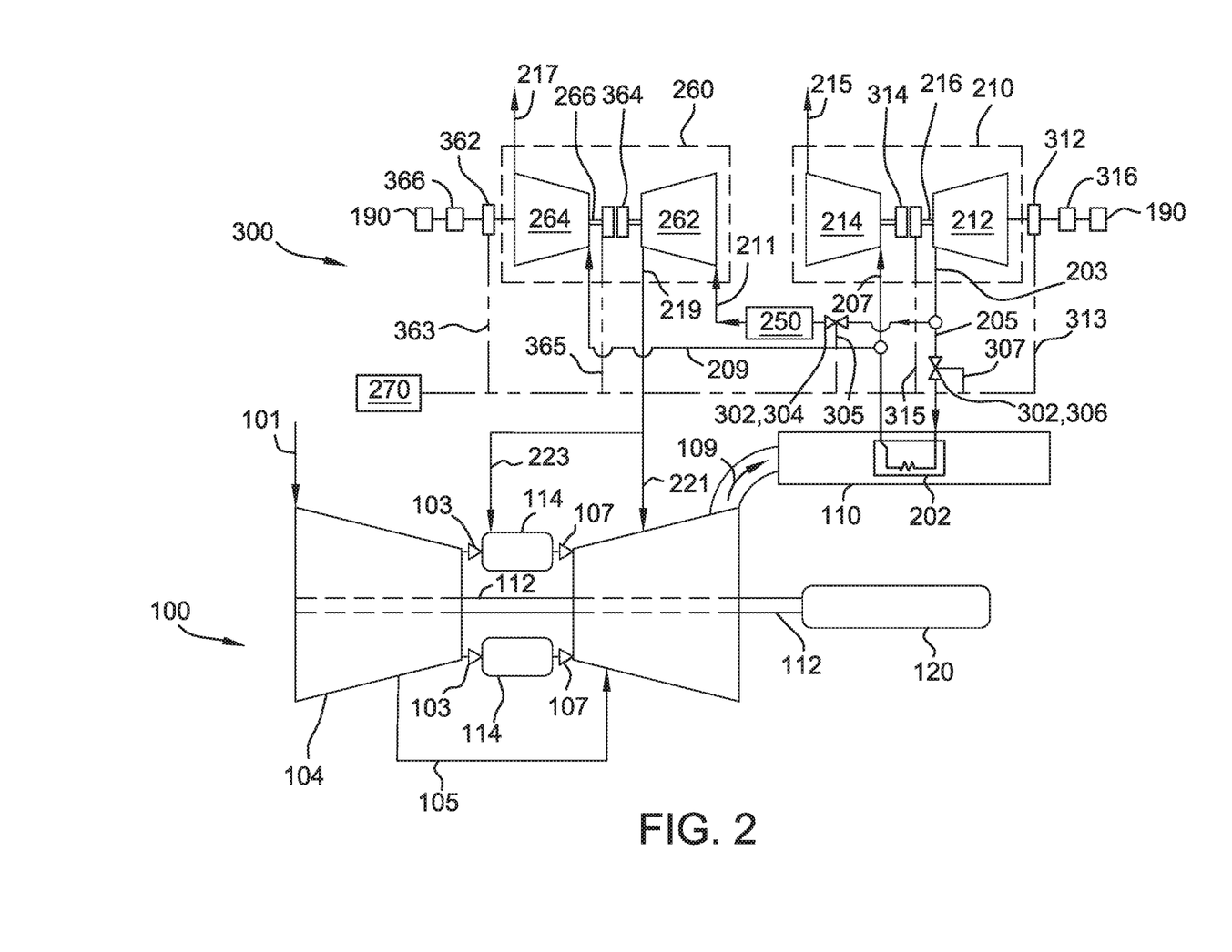
FIG. 2 is a schematic view of the rotary machine shown in FIG. 1 coupled to another exemplary turbocharger system.

FIG. 2 is a schematic view of rotary machine 100 coupled to another exemplary turbocharger system, designated turbocharger system 300. Except as described below, turbocharger system 300 is substantially identical to turbocharger system 200, and like elements are identified with like reference numbers. More specifically, turbocharger system 300 is configured to operate in at least three different modes. In a first, waste-heat-to-rotary-machine-augmentation mode, turbocharger system 300 is configured to rely solely on the residual heat in exhaust gases 109, rather than tapping energy from rotary machine 100 upstream in the working fluid path or from an external power source, to compress ambient air 201 to produce auxiliary compressed air 219, just as described above for turbocharger system 200. In a second, waste-heat-to-power-storage mode, turbocharger system 300 is configured to use the residual heat in exhaust gases 109 to charge at least one energy storage unit, and the at least one energy storage unit stores the received energy for future suitable use. In a third, stored-power-to-rotary-machine-augmentation mode, turbocharger system 300 is configured to extract stored energy from the at least one energy storage unit to compress ambient air 201 to produce auxiliary compressed air 219.

In the exemplary embodiment, LPT 210 of turbocharger system 300 further includes an LPT motor/generator 312 coupled to LPT rotor 216, and an LPT clutch 314 operable to selectively couple LPT rotor 216 between LPT turbine 214 and LPT compressor 212. More specifically, LPT clutch 314 is operable to selectively engage LPT turbine 214 for rotation with LPT compressor 212, and to selectively disengage LPT turbine 214 from LPT compressor 212. In addition, LPT motor/generator 312 is operably coupled to an LPT energy storage unit 316.

LPT motor/generator 312 is selectively operable in each of three modes. In a first, motor mode, LPT motor/generator 312 is operable to drive, that is supply power to, LPT compressor 212 using the energy stored in LPT energy storage unit 316. In a second, generator mode, when LPT clutch 314 is engaged, LPT motor/generator 312 is operable to transform the rotational energy supplied to LPT turbine 214 from the residual heat in exhaust gases 109, as described above, into energy for storage in LPT energy storage unit 316. In a third, deactivated mode, LPT motor/generator 312 is deactivated, such that LPT motor/generator 312 supplies no power to LPT compressor 212 and generates no stored energy from LPT rotor 216.

Similarly in the exemplary embodiment, HPT 260 of turbocharger system 300 further includes an HPT motor/generator 362 coupled to HPT rotor 266, and an HPT clutch 364 operable to selectively couple HPT rotor 266 between HPT turbine 264 and HPT compressor 262. More specifically, HPT clutch 364 is operable to selectively engage HPT turbine 264 for rotation with HPT compressor 262, and to selectively disengage HPT turbine 264 from HPT compressor 262. In addition, HPT motor/generator 362 is operably coupled to an HPT energy storage unit 366. Although LPT energy storage unit 316 and HPT energy storage unit 366 are illustrated as separate components, in some embodiments, LPT energy storage unit 316 and HPT energy storage unit 366 are implemented together as a single component coupled to both LPT motor/generator 312 and HPT motor/generator 362.

HPT motor/generator 362 is likewise operable in each of the three modes described above with respect to LPT motor/generator 312. In the first, motor mode, HPT motor/generator 362 is operable to drive, that is supply power to, HPT compressor 262 using the energy stored in HPT energy storage unit 366. In the second, generator mode, when HPT clutch 364 is engaged, HPT motor/generator 362 is operable to transform the rotational energy supplied to HPT turbine 264 from the residual heat in exhaust gases 109, as described above, into energy for storage in HPT energy storage unit 366. In the third, deactivated mode, HPT motor/generator 362 is deactivated, such that HPT motor/generator 362 supplies no power to HPT compressor 262 and generates no stored energy from HPT rotor 266.

Turbocharger system 300 also includes a plurality of mode selection valves 302. In the exemplary embodiment, plurality of mode selection valves 302 includes a first mode selection valve 304 and a second mode selection valve 306. First mode selection valve 304 is coupled upstream from an inlet of intercooler 250 and is operable to selectively pass or block HPT compressor inlet flow 211. Second mode selection valve 306 is coupled upstream from the inlet of heat exchanger 202 and is operable to selectively pass or block heat exchanger flow 205. In alternative embodiments, plurality of mode selection valves 302 includes any suitable number of valves at any suitable location that enables turbocharger system 300 to function as described herein.

In the exemplary embodiment, controller 270 is further programmed to selectively switch turbocharger system 300 among the first, waste-heat-to-rotary-machine-augmentation mode, the second, waste-heat-to-power-storage mode, and the third, stored-power-to-rotary-machine-augmentation mode, based for example on sensed ambient conditions, sensed operating conditions of rotary machine 100, user input, or any combination thereof. More specifically, controller 270 is programmed to selectively engage and disengage LPT clutch 314 via a control signal 315, to selectively engage and disengage HPT clutch 364 via a control signal 365, to selectively switch LPT motor/generator 312 among motor mode, generator mode, and deactivated mode via a control signal 313, to selectively switch HPT motor/generator 362 among motor mode, generator mode, and deactivated mode via a control signal 363, to selectively open and close first mode selection valve 304 via a control signal 305, and to selectively open and close second mode selection valve 306 via a control signal 307, as necessary to operate turbocharger system 300 in any of the three modes. In alternative embodiments, turbocharger system 300 is configured to selectively switch among the first, waste-heat-to-rotary-machine-augmentation mode, the second, waste-heat-to-power-storage mode, and the third, stored-power-to-rotary-machine-augmentation mode in any suitable fashion that enables turbocharger system 300 to function as described herein.

Although start-up power source 230, enhanced thrust bearing 268, the at least one actuator 272 including valves 274 and 276 and geometry adjustment actuator 278, the at least one sensor 282 including LPT speed sensor 284 and HPT speed sensor 286, and control signals 271, 273, 275, 277, 305, 307, 313, 315, 363, and 365 and feedback signals 281 shown in FIG. 1 are omitted from FIG. 2 for clarity of illustration of turbocharger system 300, it should be understood that in the exemplary embodiment, turbocharger system 300 further includes start-up power source 230, enhanced thrust bearing 268, the at least one actuator 272 including valves 274 and 276 and geometry adjustment actuator 278, the at least one sensor 282 including LPT speed sensor 284 and HPT speed sensor 286, and control signals 271, 273, 275, 277, 305, 307, 313, 315, 363, and 365 and feedback signals 281 as described with respect to turbocharger system 200. In alternative embodiments, turbocharger system 300 includes less than all of start-up power source 230, enhanced thrust bearing 268, the at least one actuator 272 including valves 274 and 276 and geometry adjustment actuator 278, the at least one sensor 282 including LPT speed sensor 284 and HPT speed sensor 286, and control signals 271, 273, 275, 277, 305, 307, 313, 315, 363, and 365 and feedback signals 281.

In operation of turbocharger system 300 in the first, waste-heat-to-rotary-machine-augmentation mode, first mode selection valve 304 and second mode selection valve 306 are both open, LPT clutch 314 and HPT clutch 364 are both engaged, and LPT motor/generator 312 and HPT motor/generator 362 are both in the deactivated mode. For example, controller 270 is programmed to selectively switch turbocharger system 300 to the first mode by sending the corresponding control signals 305, 307, 313, 315, 363, and 365. In the first mode, turbocharger system 300 operates as described above with respect to turbocharger system 200, and is configured to rely solely on the residual heat in exhaust gases 109, rather than tapping energy from rotary machine 100 upstream in the working fluid path or from an external power source such as LPT energy storage unit 316 or HPT energy storage unit 366, to compress ambient air 201 to produce auxiliary compressed air 219, just as described above for turbocharger system 200.

In operation of turbocharger system 300 in the second, waste-heat-to-power-storage mode, first mode selection valve 304 is closed, such that no flow is permitted to the inlet of HPT compressor 262 and no auxiliary compressed air 219 is generated. Second mode selection valve 306 is open, such that flow from LPT compressor 212 is channeled to heat exchanger 202 to absorb residual heat from exhaust gases 109, LPT turbine inlet flow 207 is provided to drive LPT turbine 214, and HPT turbine inlet flow 209 is provided to drive HPT turbine 264. LPT clutch 314 is engaged, such that LPT turbine 214 drives LPT compressor 212, and HPT clutch 364 is disengaged, such that HPT compressor 262 is not operated. LPT motor/generator 312 and HPT motor/generator 362 are both in the second, generation mode. For example, controller 270 is programmed to selectively switch turbocharger system 300 to the second mode by sending the corresponding control signals 305, 307, 313, 315, 363, and 365.

More specifically, in the second mode of turbocharger system 300, LPT turbine 214 drives not only LPT compressor 212, but also LPT motor/generator 312, and LPT motor/generator 312 in turn generates stored energy in LPT energy storage unit 316. Additionally, HPT turbine 264 drives solely HPT motor/generator 362, and HPT motor/generator 362 generates stored energy in HPT energy storage unit 366. Thus, in the second mode, turbocharger system 300 uses the residual heat in exhaust gases 109 to generate stored energy, rather than to compress ambient air 201 to produce auxiliary compressed air 219. In some embodiments, turbocharger system 300 is operated in the second mode under ambient conditions and/or rotary machine loading conditions in which a usable amount of residual heat is present in exhaust gases 109, but auxiliary compressed air 219 would not significantly improve an efficiency of rotary machine 100.

In operation of turbocharger system 300 in the third, stored-power-to-rotary-machine-augmentation mode, first mode selection valve 304 is open, such that flow is permitted to the inlet of HPT compressor 262 and auxiliary compressed air 219 is generated. Second mode selection valve 306 is closed, such that no flow is permitted to heat exchanger 202, no LPT turbine inlet flow 207 is provided to drive LPT turbine 214, and no HPT turbine inlet flow 209 is provided to drive HPT turbine 264. LPT clutch 314 and HPT clutch 364 are both disengaged, such that LPT compressor 212 and HPT compressor 262 are decoupled from LPT turbine 214 and HPT turbine 264, respectively. LPT motor/generator 312 and HPT motor/generator 362 are both in the first, motor mode, such that LPT motor/generator 312 draws energy from LPT energy storage unit 316 to drive LPT compressor 212, and HPT motor/generator 362 draws energy from HPT energy storage unit 366 to drive HPT compressor 262. For example, controller 270 is programmed to selectively switch turbocharger system 300 to the second mode by sending the corresponding control signals 305, 307, 313, 315, 363, and 365.

More specifically, in the third mode of turbocharger system 300, any residual heat currently present in exhaust gases 109 is not utilized. Instead, LPT turbine 214 and HPT turbine 264 are inactive, and LPT motor/generator 312 and HPT motor/generator 362 supply stored energy to drive LPT compressor 212 and HPT compressor 262, respectively, thus generating auxiliary compressed air 219 using stored energy from LPT energy storage unit 316 and HPT energy storage unit 366. In some embodiments, turbocharger system 300 is operated in the third mode under ambient conditions and/or rotary machine loading conditions in which a usable amount of residual heat is not present in exhaust gases 109, but auxiliary compressed air 219 improves an efficiency of rotary machine 100.

In some embodiments, LPT energy storage unit 316 and HPT energy storage unit 366 are also coupled to a secondary energy source 190 configured to supply energy to LPT energy storage unit 316 and HPT energy storage unit 366 for storage. For example, but not by way of limitation, secondary energy source 190 include a solar power array. For another example, but not by way of limitation, secondary energy source 190 includes a wind turbine. In some such embodiments, secondary energy source 190 enables turbocharger system 300 to operate in the third, stored-power-to-rotary-machine-augmentation mode without relying solely on energy accumulated by turbocharger system 300 in the second, waste-heat-to-power-storage mode, further facilitating efficient operation of rotary machine 100 across varying ambient and load conditions. In alternative embodiments, LPT energy storage unit 316 and HPT energy storage unit 366 are not coupled to secondary energy source 190.

In the exemplary embodiment, controller 270 is implemented using one or more electronic computing devices. Such devices typically include at least one processing device (not shown) such as a general purpose central processing unit (CPU), a graphics processing unit (GPU), a microcontroller, a reduced instruction set computer (RISC) processor, an application specific integrated circuit (ASIC), a programmable logic circuit (PLC), a field programmable gate array (FPGA), a digital signal processing (DSP) device, and/or any other circuit or processing device capable of executing the functions described herein. The methods described herein, including steps that controller 270 is configured to perform, may be encoded as executable instructions embodied in a computer readable medium, including, without limitation, a non-transitory storage device and/or a memory device coupled to the at least one processor. Such instructions, when executed by the controller or processing device, cause the controller or processing device to perform at least some of the method steps described herein. Communication between controller 270 and the at least one actuator 272, between controller 270 and the at least one sensor 282, and/or between controller 270 and LPT clutch 314, HPT clutch 364, LPT motor/generator 312, HPT motor/generator 362, first mode selection valve 304, and second mode selection valve 306, such as but not limited to via control signals 271, 273, 275, 277, 305, 307, 313, 315, 363, and 365 and feedback signals 281, may be obtained through any suitable connection, such as via hardwired or a wireless arrangement. Although controller 270 is illustrated as a discrete system, controller 270 may be implemented at least partially by at least one processor embedded within any component of rotary machine 100. The above examples are exemplary only, and thus are not intended to limit in any way the definition and/or meaning of the terms controller and processing device.

Figure 3:
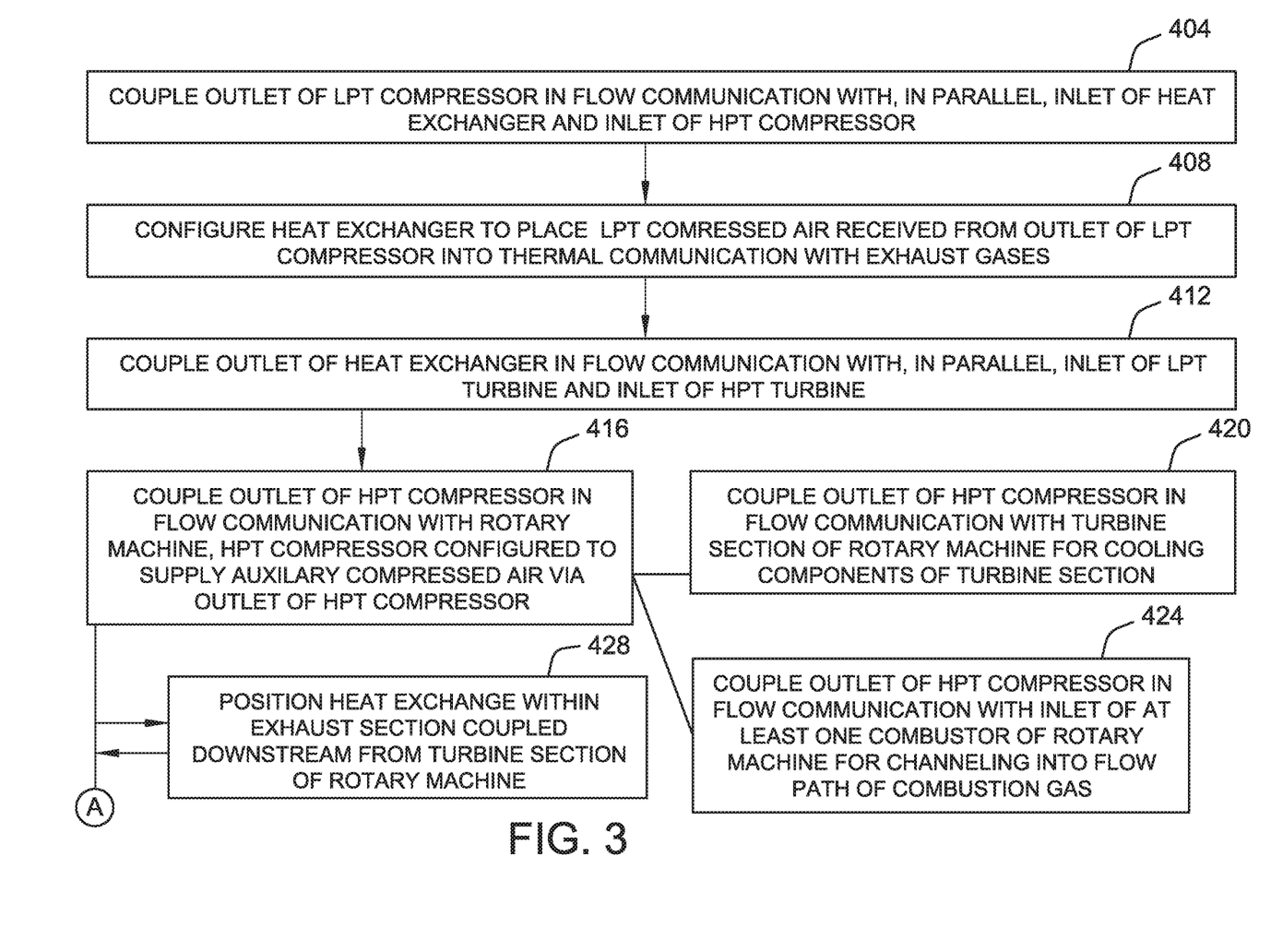
FIG. 3 is a flow diagram of an exemplary method of assembling a turbocharger system, such as the turbocharger system shown in FIG. 1, for a rotary machine, such as the rotary machine shown in FIG. 1.
Figure 4:
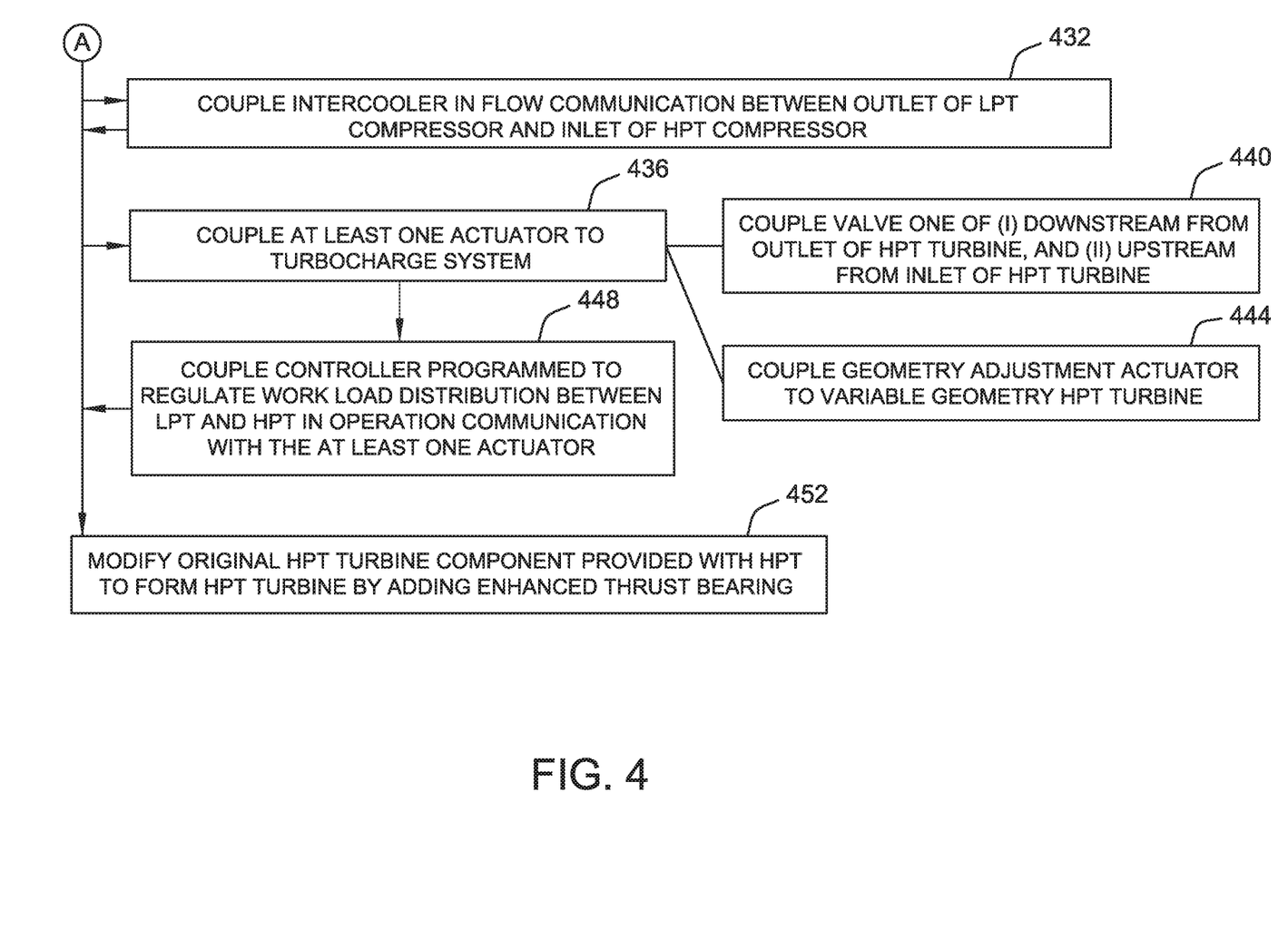
FIG. 4 is a continuation of the flow diagram of FIG. 3.

FIGS. 3 and 4 are a flow diagram of an exemplary method 400 of assembling a turbocharger system, such as turbocharger system 200, for a rotary machine, such as rotary machine 100. In the exemplary embodiment, method 400 includes coupling 404 an outlet of LPT compressor 212 of LPT 210 in flow communication with, in parallel, an inlet of heat exchanger 202 and an inlet of HPT compressor 262 of HPT 260. As described above, LPT 210 also includes LPT turbine 214 coupled to LPT compressor 212 via LPT rotor 216, HPT 260 also includes HPT turbine 264 coupled to HPT compressor 262 via HPT rotor 266, and LPT compressor 212 is configured to receive ambient air 201 and supply LPT compressed air 203 via the outlet of LPT compressor 212.

In the exemplary embodiment, method 400 also includes configuring 408 heat exchanger 202 to place LPT compressed air 203 received from the outlet of LPT compressor 212 into thermal communication with exhaust gases associated with the rotary machine, such as exhaust gases 109. Method 400 further includes coupling 412 an outlet of heat exchanger 202 in flow communication with, in parallel, an inlet of LPT turbine 214 and an inlet of HPT turbine 264.

Further in the exemplary embodiment, method 400 includes coupling 416 an outlet of HPT compressor 262 in flow communication with the rotary machine. As described above, HPT compressor 262 is configured to supply auxiliary compressed air 219 via the outlet of HPT compressor 262.

In certain embodiments, step 416 includes at least one of coupling 420 the outlet of HPT compressor 262 in flow communication with a turbine section of the rotary machine, such as turbine section 108, and coupling 424 the outlet of HPT compressor 262 in flow communication with an inlet of at least one combustor of the rotary machine, such as at least one combustor 114. The turbine section is configured to use auxiliary compressed air 219, and more specifically at least portion 221 of auxiliary compressed air 219, to cool components of the turbine section, and/or the at least one combustor is configured to channel the auxiliary compressed air 219, and more specifically at least portion 223 of auxiliary compressed air 219, into a flow path of combustion gases 107 of the rotary machine.

In some embodiments, method 400 also includes positioning 428 heat exchanger 202 within an exhaust section, such as exhaust section 110, coupled downstream from turbine section 108.

In certain embodiments, method 400 further includes coupling 432 intercooler 250 in flow communication between the outlet of LPT compressor 212 and the inlet of HPT compressor 262.

In some embodiments, method 400 additionally includes coupling 436 at least one actuator 272 to turbocharger system 200. Moreover, step 436 includes at least one of (a) coupling 440 the at least one actuator one of (i) downstream from an outlet of HPT turbine 264, and (ii) upstream from the inlet of HPT turbine 264, wherein the at least one actuator is a valve, such as valve 274 and/or 276, and (b) coupling 444 the at least one actuator to HPT turbine 264, wherein the at least one actuator is geometry adjustment actuator 278 and HPT turbine 264 is a variable geometry turbine (VGT). Such embodiments also include coupling 448 a controller, such as controller 270, in operative communication with the at least one actuator. Controller 270 is programmed to regulate the at least one actuator to regulate a work load distribution between LPT 210 and HPT 260.

In certain embodiments, method 400 further includes modifying 452 an original HPT turbine component provided with HPT 260 to form HPT turbine 264 by adding enhanced thrust bearing 268.

The above-described embodiments overcome at least some of the disadvantages of known rotary machines. Specifically, the embodiments include a turbocharger system that includes a low pressure turbocharger (LPT) and a high pressure turbocharger (HPT). The system divides ambient air compressed by the LPT compressor into a heat exchanger flow and an HPT compressor inlet flow. The HPT compressor further compress the HPT compressor inlet flow, which is then channeled to the rotary machine as auxiliary compressed air. The auxiliary compressed air provides an alternative to increasing an amount of extraction flow from the rotary machine compressor. For example, the auxiliary compressed air may be used by the rotary machine for cooling purposes, or added to the mass flow of combustion gases through the rotary machine. Also specifically, in some embodiments, the LPT turbine and the HPT turbine are each driven solely by the respective one of the parallel streams after start-up of the turbocharger system, such that no energy is tapped from the rotary machine upstream in the working fluid path, or from external sources, to drive the turbocharger system after start-up. Also specifically, in certain embodiments, the turbocharger system includes a controller and at least one actuator configured to regulate a work load distribution between the LPT and HPT across varying ambient conditions and/or operating points of the rotary machine. Also specifically, in some embodiments, the turbocharger system is additionally operable in a second, waste-heat-to-power-storage mode and a third, stored-power-to-rotary-machine-augmentation mode, which further facilitates efficient operation of the rotary machine across varying ambient and load conditions.

Exemplary embodiments of a turbocharger system, a rotary machine incorporating a turbocharger system, and a method of assembling a turbocharger system are described above in detail. The systems and methods are not limited to the specific embodiments described herein, but rather, components of systems and/or steps of methods may be utilized independently and separately from other components and/or steps described herein. For example, the turbocharger system may also be used in combination with other machines and methods, and is not limited to practice with only a rotary machine as described herein. Rather, the embodiments can be implemented and utilized in connection with many other applications.

Although specific features of various embodiments of the disclosure may be shown in some drawings and not in others, this is for convenience only. Moreover, references to "one embodiment" in the above description are not intended to be interpreted as excluding the existence of additional embodiments that also incorporate the recited features. In accordance with the principles of the disclosure, any feature of a drawing may be referenced and/or claimed in combination with any feature of any other drawing.

This written description uses examples, including the best mode, to illustrate the disclosure and also to enable any person skilled in the art to practice the disclosure, including making and using any devices or systems and performing any incorporated methods. The patentable scope of the disclosure is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

We claim:

1. A turbocharger system comprising:
    a low pressure turbocharger (LPT) comprising an LPT compressor and an LPT turbine coupled together via an LPT rotor, wherein said LPT compressor is configured to receive and compress ambient air, and wherein said turbocharger system is configured to divide the compressed ambient air into a heat exchanger flow and an HPT compressor inlet flow;
    a high pressure turbocharger (HPT) comprising an HPT compressor and an HPT turbine coupled together via an HPT rotor, wherein said HPT compressor is configured to receive and further compress the HPT compressor inlet flow, and wherein said turbocharger system is configured to channel the compressed HPT compressor inlet flow to a rotary machine as auxiliary compressed air; and
    a heat exchanger configured to place the heat exchanger flow into thermal communication with exhaust gases associated with the rotary machine, wherein said turbocharger system is configured to divide the heat exchanger flow discharged from said heat exchanger into parallel streams, and wherein said LPT turbine and said HPT turbine are each configured to be driven by a respective one of the parallel streams.

2. The turbocharger system as claimed in claim 1, wherein said LPT turbine and said HPT turbine are each configured to be driven solely by the respective one of the parallel streams after start-up of said turbocharger system.

3. The turbocharger system as claimed in claim 1, further comprising:
an LPT energy storage unit;
an HPT energy storage unit;
an LPT motor/generator coupled to said LPT rotor, said LPT motor/generator is selectively operable in each of (i) a first mode, wherein said LPT motor/generator is operable to drive said LPT compressor using energy stored in said LPT energy storage unit, (ii) a second mode, wherein said LPT motor/generator is operable to transform rotational energy supplied to said LPT turbine from residual heat of the exhaust gases into energy for storage in said LPT energy storage unit, and (iii) a deactivated mode; and
an HPT motor/generator coupled to said HPT rotor, wherein said HPT motor/generator is selectively operable in each of (i) the first mode, wherein said HPT motor/generator is operable to drive said HPT compressor using energy stored in said HPT energy storage unit, (ii) the second mode, wherein said HPT motor/generator is operable to transform rotational energy supplied to said HPT turbine from residual heat of the exhaust gases into energy for storage in said HPT energy storage unit, and (iii) the deactivated mode.

4. The turbocharger system as claimed in claim 1, wherein said HPT turbine further comprises an enhanced thrust bearing.

5. The turbocharger system as claimed in claim 1, further comprising an intercooler positioned in flow communication between an outlet of said LPT compressor and an inlet of said HPT compressor, wherein said intercooler is configured to decrease a temperature of the HPT compressor inlet flow.

6. The turbocharger system as claimed in claim 1, further comprising:
at least one actuator; and
a controller operatively coupled to said at least one actuator, wherein said controller is programmed to regulate said at least one actuator to regulate a work load distribution between said LPT and said HPT.

7. The turbocharger system as claimed in claim 6, wherein said at least one actuator comprises one of:
a valve that is coupled one of (i) downstream from an outlet of said HPT turbine, and (ii) upstream from an inlet of said HPT turbine; and
a geometry adjustment actuator coupled to said HPT turbine, wherein said HPT turbine comprises a variable geometry turbine.

8. A rotary machine comprising:
a compressor section configured to receive and compress intake air;
a turbine section coupled to said compressor section via a rotor;
a combustor section comprising at least one combustor configured to receive the compressed intake air from said compressor section, generate combustion gases, and channel the combustion gases into said turbine section such that a rotational force is imparted on said rotor, wherein the combustion gases are exhausted from said turbine section as exhaust gases; and
a turbocharger system comprising:
a low pressure turbocharger (LPT) comprising an LPT compressor and an LPT turbine coupled together via an LPT rotor, wherein said LPT compressor is configured to receive and compress ambient air, and wherein said turbocharger system is configured to divide the compressed ambient air into a heat exchanger flow and an HPT compressor inlet flow;
a high pressure turbocharger (HPT) comprising an HPT compressor and an HPT turbine coupled together via an HPT rotor, wherein said HPT compressor is configured to receive and further compress the HPT compressor inlet flow, and wherein said turbocharger system is configured to channel the compressed HPT compressor inlet flow to at least one of said combustor section and said turbine section as auxiliary compressed air; and
a heat exchanger configured to place the heat exchanger flow into thermal communication with the exhaust gases, wherein said turbocharger system is configured to divide the heat exchanger flow discharged from said heat exchanger into parallel streams, and wherein said LPT turbine and said HPT turbine are each configured to be driven by a respective one of the parallel streams.

9. The rotary machine as claimed in claim 8, wherein said turbocharger system is configured to channel at least a portion of the auxiliary compressed air to said turbine section, and wherein said turbine section is configured to use the portion of the auxiliary compressed air to cool components of said turbine section exposed to the combustion gases.

10. The rotary machine as claimed in claim 8, wherein said turbocharger system is configured to channel at least a portion of the auxiliary compressed air to an inlet of said at least one combustor, and wherein said at least one combustor is configured to channel the portion of the auxiliary compressed air into a flow path of the combustion gases.

11. The rotary machine as claimed in claim 8, further comprising an exhaust section coupled downstream from said turbine section, wherein said heat exchanger is positioned within said exhaust section.

12. The rotary machine as claimed in claim 8, wherein said LPT turbine and said HPT turbine are each configured to be driven solely by the respective one of the parallel streams after start-up of said turbocharger system.

13. The rotary machine as claimed in claim 8, further comprising an intercooler positioned in flow communication between an outlet of said LPT compressor and an inlet of said HPT compressor, wherein said intercooler is configured to decrease a temperature of the HPT compressor inlet flow.

14. The rotary machine as claimed in claim 8, further comprising:
at least one actuator; and
a controller operatively coupled to said at least one actuator, wherein said controller is programmed to regulate said at least one actuator to regulate a work load distribution between said LPT and said HPT.

15. The rotary machine as claimed in claim 14, wherein said at least one actuator comprises one of:
a valve that is coupled one of (i) downstream from an outlet of said HPT turbine, and (ii) upstream from an inlet of said HPT turbine; and
a geometry adjustment actuator coupled to said HPT turbine, wherein said HPT turbine comprises a variable geometry turbine.

16. A method of assembling a turbocharger system for a rotary machine, said method comprising:
coupling an outlet of an LPT compressor of a low pressure turbocharger (LPT) in flow communication with, in parallel, an inlet of a heat exchanger and an inlet of an HPT compressor of a high pressure turbocharger (HPT), wherein:
the LPT includes an LPT turbine coupled to the LPT compressor via an LPT rotor, the HPT includes an HPT turbine coupled to the HPT compressor via an HPT rotor, and the LPT compressor is configured to receive ambient air and supply LPT compressed air via the outlet of the LPT compressor;

configuring the heat exchanger to place the LPT compressed air received from the outlet of the LPT compressor into thermal communication with exhaust gases associated with the rotary machine;

coupling an outlet of the heat exchanger in flow communication with, in parallel, an inlet of the LPT turbine and an inlet of the HPT turbine; and coupling an outlet of the HPT compressor in flow communication with the rotary machine, wherein the HPT compressor is configured to supply auxiliary compressed air via the outlet of the HPT compressor.

17. The method as claimed in claim 16, wherein said coupling the outlet of the HPT compressor in flow communication with the rotary machine comprises at least one of:

coupling the outlet of the HPT compressor in flow communication with a turbine section of the rotary machine, wherein the turbine section is configured to use the auxiliary compressed air to cool components of the turbine section, and coupling the outlet of the HPT compressor in flow communication with an inlet of at least one combustor of the rotary machine, wherein the at least one combustor is configured to channel the auxiliary compressed air into a flow path of combustion gases of the rotary machine.

18. The method as claimed in claim 16, further comprising positioning the heat exchanger within an exhaust section coupled downstream from a turbine section of the rotary machine.

19. The method as claimed in claim 16, further comprising coupling an intercooler in flow communication between the outlet of the LPT compressor and the inlet of the HPT compressor.

20. The method as claimed in claim 16, further comprising:

coupling at least one actuator to the turbocharger system, comprising one of:

coupling the at least one actuator one of (i) downstream from an outlet of the HPT turbine, and (ii) upstream from the inlet of the HPT turbine, wherein the at least one actuator is a valve, and coupling the at least one actuator to the HPT turbine, wherein the at least one actuator is a geometry adjustment actuator, and wherein the HPT turbine is a variable geometry turbine; and coupling a controller in operative communication with the at least one actuator, wherein the controller is programmed to regulate the at least one actuator to regulate a work load distribution between the LPT and the HPT.

* * * * *